United States Patent
Bi et al.

(10) Patent No.: US 10,656,473 B2
(45) Date of Patent: May 19, 2020

(54) CURVED DISPLAY PANEL AND CURVED DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Ruilin Bi, Beijing (CN); Qiang Xiong, Beijing (CN); Kui Zhang, Beijing (CN); Xiongzhou Wei, Beijing (CN); Chao Liu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/995,659

(22) Filed: Jun. 1, 2018

(65) Prior Publication Data
US 2019/0101783 A1    Apr. 4, 2019

(30) Foreign Application Priority Data
Sep. 29, 2017 (CN) ............ 2017 1 0908691

(51) Int. Cl.
*G02F 1/1339* (2006.01)
*G02F 1/1333* (2006.01)

(52) U.S. Cl.
CPC ...... *G02F 1/13394* (2013.01); *G02F 1/13392* (2013.01); *G02F 1/133305* (2013.01); *G02F 2001/13396* (2013.01)

(58) Field of Classification Search
CPC ........... G02F 1/133305; G02F 1/13392; G02F 1/0107; G02F 1/1339; G02F 1/13394;
(Continued)

(56) References Cited
U.S. PATENT DOCUMENTS 10,114,252 B2    10/2018 Qu
2007/0009677 A1*  1/2007 Ebisu ................. G02F 1/13394
                                                          428/1.54
(Continued)

FOREIGN PATENT DOCUMENTS

CN    101566756 A    10/2009
CN    203084383 U     7/2013
(Continued)

OTHER PUBLICATIONS

The First Chinese Office Action dated Dec. 4, 2019; Appln No. 201710908691.9.

*Primary Examiner* — Shan Liu

(57) ABSTRACT

A curved display panel includes a first substrate and a second substrate cell-assembled to each other, a spacer layer disposed between the first substrate and the second substrate and configured to support the first substrate and the second substrate so as to form a gap, and a liquid crystal layer disposed in the gap, wherein the spacer layer includes a plurality of spacer groups, each of the plurality of spacer groups includes a first spacer provided on the first substrate and a second spacer provided on the second substrate, the plurality of spacer groups have supporting area on the first substrate as same as supporting area on the second substrate. A curved display device is further provided.

10 Claims, 2 Drawing Sheets

(58) Field of Classification Search
CPC .............. G02F 1/161; G02F 1/133707; G02F
1/133377; G02F 2001/13396; G02F
2001/13398; G02F 1/1333; G02F
1/136277; G02F 2001/133302; G02F
2001/133368; G02F 2001/133354; G02F
2201/56; H01L 27/3246; H01L 27/12;
H01L 27/1203; H01L 27/1218; H01L
21/02367
USPC .................................................. 349/155–158
See application file for complete search history.

(56) References Cited

U.S. PATENT DOCUMENTS

| | | | | |
|---|---|---|---|---|
| 2010/0231842 | A1* | 9/2010 | Ishitani | G02F 1/13394 349/156 |
| 2013/0321749 | A1* | 12/2013 | Zhong | G02F 1/13394 349/106 |
| 2013/0335691 | A1* | 12/2013 | Wu | G02F 1/13394 349/155 |
| 2015/0002794 | A1* | 1/2015 | Liu | G02F 1/134309 349/106 |
| 2016/0026023 | A1* | 1/2016 | Zhao | G02F 1/133305 359/892 |
| 2016/0147102 | A1 | 5/2016 | Ma et al. | |
| 2016/0231607 | A1* | 8/2016 | Wu | G02F 1/1339 |
| 2017/0068124 | A1* | 3/2017 | Ma | G02F 1/133514 |
| 2017/0235179 | A1* | 8/2017 | Xie | G02F 1/13394 349/122 |
| 2018/0113335 | A1* | 4/2018 | Jin | G02F 1/1323 |
| 2018/0348556 | A1* | 12/2018 | Jin | G02F 1/1339 |

FOREIGN PATENT DOCUMENTS

| | | |
|---|---|---|
| CN | 103676335 A | 3/2014 |
| CN | 103955096 A | 7/2014 |
| CN | 203825337 U | 9/2014 |
| CN | 104375333 A | 2/2015 |
| CN | 104932153 A | 9/2015 |
| CN | 105807504 A | 7/2016 |
| JP | 2009115933 A | 5/2009 |

* cited by examiner

CURVED DISPLAY PANEL AND CURVED DISPLAY DEVICE

The present disclosure claims priority of Chinese Patent Application No. 201710908691.9 filed on Sep. 29, 2017, the disclosure of which is hereby entirely incorporated by reference as a part of the present disclosure.

TECHNICAL FIELD

Embodiments of the present disclosure relate to a curved display panel and a curved display device.

BACKGROUND

A liquid crystal display panel comprises an array substrate, a counter substrate, and a liquid crystal layer and a photo spacer (PS) located between the array substrate and the counter substrate. The spacer is configured as a support to keep the gap between the array substrate and the counter substrate, so as to avoid excessive pressure on the liquid crystal molecules between the array substrate and the counter substrate.

With the maturation of liquid crystal display technology, a display screen can be properly bent to have an ergonomic curvature, so that the distance between the human eye and each point on the screen is the same so as to obtain a better visual effect. Such a curved display panel has become a further trend of the display panel, especially when applied to a large-size display, the curved display panel can provide a viewing field and enable the user to obtain a more intense on-site effect and sensory experience.

SUMMARY

At least one embodiment of the present disclosure provides a curved display panel, comprising a first substrate and a second substrate cell-assembled to each other, a spacer layer disposed between the first substrate and the second substrate and configured to support the first substrate and the second substrate so as to form a gap, and a liquid crystal layer disposed in the gap, wherein the spacer layer comprises a plurality of spacer groups, each of the plurality of spacer groups comprises a first spacer provided on the first substrate and a second spacer provided on the second substrate, the plurality of spacer groups have supporting area on the first substrate as same as supporting area on the second substrate.

In one embodiment of the present disclosure, a top surface area of the first spacer is equal to a top surface area of the second spacer, a bottom surface area of the first spacer is equal to a bottom surface area of the second spacer, and an orthogonal projection of the first spacer on a surface of the first substrate and an orthogonal projection of the second spacer on the surface of the first substrate are non-overlapping.

In one embodiment of the present disclosure, a bottom surface area of the first spacer is equal to a bottom surface area of the second spacer, and an orthogonal projection of a top surface of the first spacer on a surface of the first substrate is within an orthogonal projection of the second spacer on the surface of the first substrate.

In one embodiment of the present disclosure, a first area, a second area, a third area, a fourth area and a fifth area that are parallel to the non-curved edge and are equal in size are selected in a direction parallel to the non-curved edge of the curved display panel, wherein a first trisector of the curved display panel in the non-curved direction is located in the second area, and a second trisector of the curved display panel in the non-curved direction is located in the fourth area, the first and second trisectors are lines that are parallel to the non-curved edges of the curved display panel and divide the curved display panel into three regions equal in size; and supporting area of the spacer group on the first substrate and the second substrate in any one of the second area and the fourth area is greater than supporting area of the spacer group on the first substrate and the second substrate in any one of the first area, the third area and the fifth area.

In one embodiment of the present disclosure, density of the spacer group in any one of the second area and the fourth area is greater than density of the spacer group in any one of the first area, the third area and the fifth area.

In one embodiment of the present disclosure, a bottom surface area and a top surface area of the first spacer and the second spacer of the spacer group in any one of the second area and the fourth area are greater than a bottom surface area and a top surface area of the first spacer and the second spacer of the spacer group in any one of the first area, the third area and the fifth area.

In one embodiment of the present disclosure, a ratio of the supporting area of the spacer group on the first substrate and the second substrate in any one of the second area and the fourth area to the supporting area of the spacer group on the first substrate and the second substrate is in any one of the first area, the third area and the fifth area is greater than 1 and less than or equal to 2.

In one embodiment of the present disclosure, a first area, a second area, a third area, a fourth area and a fifth area that are parallel to the non-curved edge and are equal in size are selected in a direction parallel to the non-curved edge of the curved display panel, wherein a first trisector of the curved display panel in the non-curved direction is located in the second area, and a second trisector of the curved display panel in the non-curved direction is located in the fourth area, the first and second trisectors are lines that are parallel to the non-curved edges of the curved display panel and divide the curved display panel into three regions equal in size; height of the spacer group in any one of the second area and the fourth area is greater than height of the spacer group in any one of the first area, the third area and the fifth area.

In one embodiment of the present disclosure, a ratio of the height of the spacer group in any one of the second area and the fourth area to the height of the spacer group in any one of the first area, the third area and the fifth area is greater than 1 to less than or equal to 1.1.

At least one embodiment of the present disclosure provides a curved display device comprising the curved display panel as described above.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

The spacers are usually formed on the array substrate or the counter substrate of the liquid crystal display panel by way of exposure and development of organic macromolecular materials. Due to limitations of the manufacturing process, the manufactured spacers are generally truncated cone and the bottom area is larger than the top area. Due to the difference between the bottom area of the spacer and the top area, the supporting areas of the spacer on the array substrate and the counter substrate are not the same. In the curved display panel formed by bending the display panel with an appropriate curvature, the pressing forces applied on the array substrate and on the counter substrate are the same, but the supporting areas of the spacers on the array substrate and the counter substrate are different, so that the pressure on the array substrate and the counter substrate are different. This difference in pressure causes a change in the thickness of the liquid crystal cell of the liquid crystal display panel, which affects the quality of the display panel display screen. In severe cases, cracks or breakage may occur to the display panel.

Figure 1:
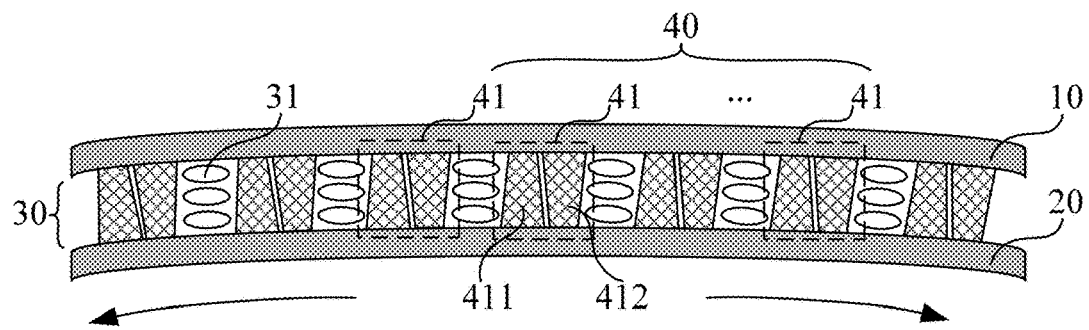
FIG. 1 is a schematic structural view of a curved display panel according to an embodiment of the present disclosure.

At least one embodiment of the present disclosure provides a curved display panel. As illustrated in FIG. 1, the curved display panel comprises a first substrate 10 and a second substrate 20 cell-assembled to each other, and a liquid crystal layer 31 disposed in a gap 30 between the first substrate 10 and the second substrate 20. The curved display panel further comprises a spacer layer 40 disposed between the first substrate 10 and the second substrate 20 and configured to support the first substrate 10 and the second substrate 20 so as to form the gap 30. The spacer layer 40 comprises a plurality of spacer groups 41. Each of the plurality of spacer groups 41 comprises a first spacer 411 disposed on the first substrate 10 and a second spacer 412 disposed the second substrate 20. Each of the plurality of spacer groups 41 has a supporting area on the first substrate 10 equal to a supporting area of the spacer group 41 on the second substrate 20.

It should be noted that, first, as illustrated in FIG. 1, the first substrate 10 and the second substrate 20 are cell-assembled to each other, wherein the first substrate 10 and the second substrate 20 can be an array substrate and a color filter substrate cell-assembled to each other. Alternatively, for a display panel in which a black matrix and a color filter are disposed on an array substrate (COA for short), the first substrate 10 and the second substrate 20 can also be an array substrate and a package substrate (or counter substrate).

Secondly, the spacer layer 40 is configured to support the first substrate 10 and the second substrate 20 so as to form the gap 30, and a sealant is applied at the edges of the first substrate 10 and the second substrate 20 (not illustrated in FIG. 1) to seal the gap 30 so as to form a space for accommodating the liquid crystal layer 31. The space may also be called a liquid crystal cell.

Thirdly, as illustrated in FIG. 1, when a curved display panel according to an embodiment of the present disclosure is in a display state, the display surface thereof is a curved surface, and a curved television is taken as an example. When a user watches images displayed on the curved television, in order to make the distance between the human eyes and the center position of the curved television relatively close to the distance from the human eye to the edge of the curved television, it is necessary to bend the curved television at both ends in the horizontal direction toward the direction in which the human eye is located (the being direction as illustrated in FIG. 1). With respect to the flat TV, the curved television can make the distance between the human eye to the center position of the curved TV and the distance of the human eye to the edge of the curved TV close to or even equal. The bent curved display panel has curved edges on both sides in the horizontal direction, that is, curved edges, and the two sides in the vertical direction are still linear, and non-curved. Hereinafter, for ease of illustration and description, the curved direction of the curved surface as indicated by the arrow in FIG. 1, that is, the direction toward the non-curved side of the curved display panel, the other drawings and explanations are the same.

Fourthly, in the relevant arts, the spacer layer 40 provided in the liquid crystal display panel is typically used to support the space between the first substrate 10 and the second substrate 20, thereby controlling the cell thickness of the liquid crystal layer 30. The spacers of the spacer layer 40 are typically provided in two ways. The first is to provide particle spacers. After printing and aligning an alignment film, the particle spacers are sprayed onto the surface of the alignment film. Since the spacers are in the form of particles and they are not connected to the first substrate 10 or to the second substrate 20, the spacer may move in a certain range. The second is to dispose one end of a spacer on the first substrate 10 to form a spacer layer 40. The spacers in the spacer layer 40 formed in this way is fixed, for example, for example, patterns of the spacer layer 40 can be directly formed on the first substrate 10 by patterning. Due to process limitations, the formed spacer typically has a shape of truncated cone, and the size of the upper surface is smaller than the size of the lower surface, that is, the supporting area of the spacer layer on the first substrate 10 is greater than the area of the upper surface of the spacer abutting on the second substrate 20. In embodiments according to the present disclosure, the spacer in the spacer layer 40 is a truncated-cone spacer made in the second way.

Fifth, as illustrated in FIG. 1, the spacer group 41 comprises a first spacer 411 disposed on the first substrate 10 and a second spacer 412 disposed on the second substrate 20, wherein the supporting area of the spacer group 41 on the first substrate 10 comprises sum of the surface area of the first spacer 411 fixed on the first substrate 10 and supporting the force from the first substrate 10 after the cell-assembly and the surface area of the second spacer 412 disposed on the second substrate and abutting against the first substrate 10 and supporting the force from the second substrate 10 after the cell-assembly. Similarly, the support area of the spacer group 41 on the second substrate 20 comprises sum of the supporting area of the second spacer 412 fixed on the second substrate 20 that supports the force from the second substrate 20 after the cell-assembly and the supporting area of the first spacer 411 provided on the first substrate 10 abutting against the second substrate 20 and supporting the force from the second substrate 20 after the cell-assembly. For example, as illustrated in FIG. 1, the first spacer 411 and the second spacer 412 can have the same shape and are disposed in opposite directions.

In addition, the number of the first spacers 411 and the second spacers 412 are not limited in the spacer group 41 according to the embodiment of the present disclosure. Exemplarily, as illustrated in FIG. 1, one spacer group 41 can comprise one first spacer 411 and one second spacer 412. Alternatively, one spacer group 41 can include a plurality of first spacers. 411 and a plurality of second spacers 412, and the embodiments of the present disclosure are not limited thereto, as long as the supporting area of each spacer group 41 on the first substrate 10 can be made equal to the supporting area thereof on the second substrate 20.

A curved display panel according to an embodiment of the present disclosure comprises a first substrate and a second substrate cell-assembled to each other, a liquid crystal layer disposed in a gap between the first substrate and the second substrate, and the curved display panel further comprises a spacer layer, the spacer layer disposed between the first substrate and the second substrate and configured to support the first substrate and the second substrate so as to form the gap. The spacer layer comprises a plurality of spacer groups. Each of the plurality of spacer groups comprises a first spacer disposed on the first substrate and a second spacer disposed on the second substrate. The supporting area of each of the plurality of spacer groups on the first substrate is equal to the supporting area of the spacer group on the second substrate. By providing a spacer layer comprising a plurality of spacer groups disposed between the first substrate and the second substrate, the spacer group comprising a first spacer disposed on the first substrate and a second substrate disposed on the second substrate, and the supporting area of the spacer group on the first substrate being equal to the supporting area of the spacer group on the second substrate, the pressure of the spacer layer on the first substrate is substantially equal to the pressure of the spacer layer on the second substrate, so that the overall cell thickness of the liquid crystal layer is relatively uniform, and the display quality of the curved display panel is improved.

For example, as illustrated in FIG. 1, the first spacer 411 and the second spacer 412 have the same bottom surface area and the same top surface area, and the orthogonal projections of the first spacer 411 and the second spacer 412 in a direction perpendicular to the first substrate 10 are non-overlapping.

As illustrated in FIG. 1, the first and second spacers 411 and 412 in the spacer group 41 have the same bottom surface area and the same top surface area, and the orthogonal projections of the first and second spacers 411 and 411 in a direction perpendicular to the first substrate 10 are non-overlapping, that is, after the first substrate 10 and the second substrate 20 are cell-assembled, the top surfaces of all the first spacers 411 abut against the second substrate 20, the top surfaces of all the second spacers 412 abut against the first substrate 10. For example, the first spacer 411 and the second spacer 412 have the same shape and are respectively disposed on the first substrate 10 and the second substrate 20, so that for each spacer group 41, the supporting area for supporting the first substrate 10 comprises a bottom surface area of a first spacer 411 and a top surface area of a second spacer 412, and the supporting area for supporting the second substrate 20 comprises the bottom surface area of a second spacer 412 and the top surface area of a first spacer 411, and it is the same for each of the plurality of spacer groups 41 included in the spacer layer 40. Thus, the pressure of the spacer layer 40 applying on the first substrate 10 and the pressure of the spacer layer 40 applying on the second substrate 20 are the same or substantially the same, so that the overall cell thickness of the liquid crystal layer 31 can be made uniform.

Figure 2:
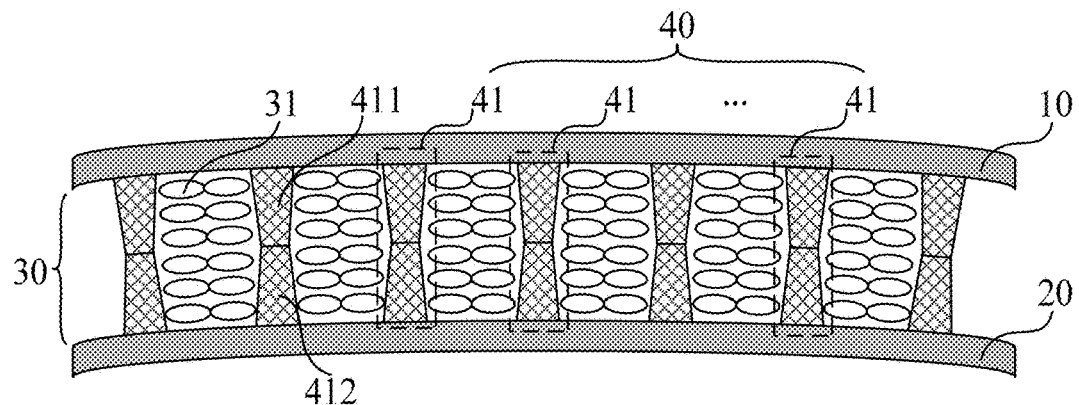
FIG. 2 is a schematic structural view of a curved display panel according to another embodiment of the present disclosure.

In one embodiment according to the present disclosure, as illustrated in FIG. 2, the bottom surface areas of the first spacer 411 and the second spacer 412 are the same, and the orthogonal projection of the top surface of the first spacer 411 in a direction perpendicular to the first substrate 10 is within the orthogonal projection of the bottom surface of the second spacer 412 in the direction perpendicular to the first substrate 10.

Then, as illustrated in FIG. 2, after the first substrate 10 and the second substrate 20 are cell-assembled, in each spacer group 41, the orthogonal projection of the top surface of the first spacer 411 in a direction perpendicular to the first substrate 10 is within the bottom surface of the second spacer 412 in the direction perpendicular to the first substrate 10, such that the top surface of the first spacer 411 provided on the first substrate 10 can abut against the top surface of the second spacer 412 provided on the second substrate 20, that is, for each of the spacer group, it supporting area on the first substrate 10 is the bottom surface area of the first spacer 411, and its supporting area on the second substrate 20 is the bottom surface area of the second spacer 412. And then, the pressure of the spacer layer 40 applying on the first substrate 10 and the pressure of the spacer layer 40 applying on the second substrate 20 are equal to each other.

It should be noted that in order to reduce the risk that the top surface of the first spacer 411 and the top surface of the second spacer 412 are slipped during the process that the first spacer 411 and the second spacer 412 come into contact and abut each other, as illustrated in FIG. 2, in the spacer group 41, the first spacer 411 and the second spacer 412 have the same shape, and then, when the first spacer 411 abuts against the second spacer 412, In this case, the top surface of the first spacer 411 and the top surface of the second spacer 412 that are in contact with each other have the same shape and position. The area of the top surface of the first spacer 411 that is abutted is the largest, which relatively reduces the risk of slippage during the abutting.

Figure 3:
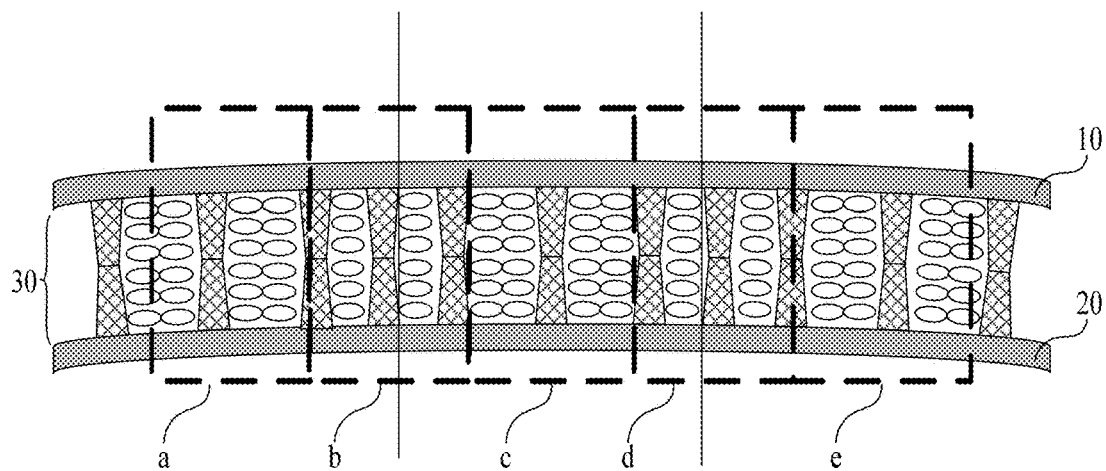
FIG. 3 is a schematic structural view of a curved display panel according to still another embodiment of the present disclosure.

In an embodiment according to the present disclosure, as illustrated in FIG. 3, a first area, a second area, a third area, a fourth area and a fifth area that are parallel to the non-curved edge and are equal in size are selected in a direction parallel to the non-curved edge of the curved display panel, wherein a first trisector of the curved display panel in the non-curved direction is located in the second area, and a second trisector of the curved display panel in the non-curved direction is located in the fourth area, the first area, the second area, the third area, the fourth area, and the fifth area respectively correspond to the first area a, the second area b, the third area c, the fourth area d, and the fifth area c as illustrated in FIG. 3. The first and second trisectors refer to lines that are parallel to the non-curved edges of the curved display panel and divide the curved display panel into three regions equal in size. The spacer group 41 has a larger supporting area on the first substrate 10 and the second substrate 20 in the second area (the area b illustrated in FIG. 3) or in the fourth area (the area d illustrated in FIG. 3) than the supporting area of the spacer groups 41 on the first substrate 10 and on the second substrate 20 in any one of the first area, the third area, and the fifth area (the area a, the area c, and the area e illustrated in FIG. 3).

It should be noted that, according to Newton's laws of mechanics, the effects of forces are mutual, and a forces and its reaction force have the same magnitude and opposite directions. For the curved display panel according to an embodiment of the present disclosure, on the first substrate 10 and the second substrate 20 of the curved display panel, the bending extrusion stress received by the area where the trisector is located is the max. If the supporting forces by the spacer groups 41 of the spacer layer 40 at the various positions of the curved display panel are equal, there is still a large amount of bending extrusion stress in the area where the trisector is located when the supporting force by the spacer layer 40 and the bending extrusion stress are balanced in other areas, which may still cause the thickness of the liquid crystal cell of the curved display panel non-uniform.

So, as illustrated in FIG. 3, a first area, a second area, a third area, a fourth area and a fifth area that are parallel to the non-curved edge and are equal in size are selected in a direction parallel to the non-curved edge of the curved display panel, wherein a first trisector of the curved display panel in the non-curved direction is located in the second area, and a second trisector of the curved display panel in the non-curved direction is located in the fourth area, the first area, the second area, the third area, the fourth area, and the fifth area respectively correspond to the area a, the area b, the area c, the area d, and the area e as illustrated in FIG. 3. The first and second trisectors refer to lines that are parallel to the non-curved edges of the curved display panel and divide the curved display panel into three regions equal in size. The spacer group 41 has a larger supporting area on the first substrate 10 and the second substrate 20 in the second area (the area b illustrated in FIG. 3) or in the fourth area (the area d illustrated in FIG. 3) than the supporting area of the spacer groups 41 on the first substrate 10 and on the second substrate 20 in any one of the first area, the third area, and the fifth area (the area a, the area c, and the area e illustrated in FIG. 3). In this way, in the second area b and the fourth area d where the bending extrusion stress is large, by making the support area provided by the spacer group 41 larger in the second area b and the fourth area d, the first substrate 10 and the second substrate 20 are provided more supporting force to balance the bending extrusion stress.

In addition, since the bending extrusion stresses applied to the curved display panels are gradually changed at various places, for example, the curved display panel can be divided into more areas so that the supporting area of the spacer groups 41 are gradually changed corresponding to the gradual change of the bending extrusion stress, such that the bending extrusion stress received by the curved display panel is better balanced with the supporting force in each area. The height of the spacer layer 40 on the curved display panel is configured in the same say.

For example, as illustrated in FIG. 3, a ratio of the supporting area of the spacer group 41 on the first substrate 10 and the second substrate 20 in the second area b and the fourth area d to the supporting area of the spacer group 41 on the first substrate 10 and the second substrate 20 is in the first area a, the third area c and the fifth area e is greater than 1 and less than or equal to 2.

If the ratio of the supporting area of the spacer group 41 on the first substrate 10 and the second substrate 20 in the second area b and the fourth area d to the supporting area of the spacer group 41 on the first substrate 10 and the second substrate 20 is in the first area a, the third area c and the fifth area e is equal to 1, which means that the support areas of the spacer groups 41 on the curved display panel are set to be equal. Thus, the supporting forces by the spacer group 41 on both the first substrate 10 and the second substrate 20 are the same, and it is impossible to balance the bending extrusion stress on the curved display panel at a position where the bending extrusion stress is greater so as to solve the problem that the bending extrusion stress in the second area b and the forth area d of the curved display panel, by providing a larger supporting area at the position where the bending extrusion stress is greater. Since the bending extrusion stress on the second area b and the fourth area d of the curved display panel is greater than the bending extrusion stress on other areas, the difference between the bending extrusion stress in the second area b and the fourth area d and in other areas will be changed depending on the size of the curved display panel, but usually distributed in a certain range. If the ratio of the supporting area of the spacer group 41 on the first substrate 10 and the second substrate 20 in the second area b and the fourth area d to the supporting area of the spacer group 41 on the first substrate 10 and the second substrate 20 is in the first area a, the third area c and the fifth area c is greater than 2, the supporting force on the second area b and the fourth area d will be too great due to the too large supporting area of the spacer group 41 on the first substrate 10 and the second substrate 20 in the second area b and in the fourth area d, which is not helpful to balance the bending extrusion stress at various positions all over the curved display panel.

For example, as illustrated in FIG. 3, the density of the spacer group 41 in the second area b and the fourth area d is greater than the density in the first area a, the third area c, and the fifth area e.

In this way, as illustrated in FIG. 3, by providing a larger number of spacer groups 41 in the second area b and the fourth area d, the spacer group 41 can provide a greater supporting force to the first substrate 10 and the second area in the second area b and the fourth area d, so as to counteract the larger bending stress of the curved display panel at the positions of the second area b and the fourth area d. Also, since the bending pressing stress is relatively small for the curved display panel at the positions of the first area a, the third area c, and the fifth area e, a relatively small number of the spacer groups 41 are provided to balance the corresponding bending pressing force, and thus achieving uniform force at various locations on the curved display panel.

Figure 4:
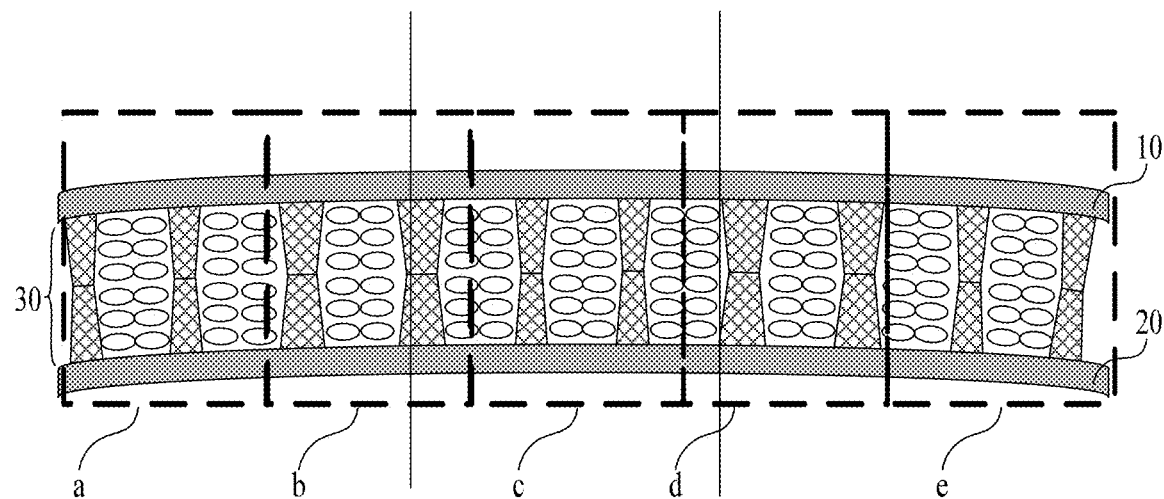
FIG. 4 is a schematic structural diagram of a curved display panel according to yet another embodiment of the present disclosure.

For example, as illustrated in FIG. 4, the bottom surface area and the top surface area of the first spacer 411 and the second spacer 412 of the spacer group 41 in the second area b and the fourth area d are greater than those The of the bottom surface area and the top surface area of the first spacer 411 and the second spacer 412 in the spacer group 41 in the first area a, the second area c and the fifth area e.

Thus, as illustrated in FIG. 4, by providing the first spacer 411 and the second spacer 412 having a relatively larger bottom surface area and top surface area on the first substrate 10 and the second substrate 20, respectively, in the second area b and the fourth area d, the space group 41 can provide greater supporting force to the first substrate 10 and the second substrate 20 in the second area b and the fourth area d, so as to counteract the greater bending extrusion stress on the curved display panel in the second area b and the fourth area d. Similarly, as the bending extrusion stress is relatively small on the curved display panel at the positions of the first area a, the third area c, and the fifth area c, a first space 411 and a second space 411 with relatively small bottom surface area and top surface area are respectively provided on the first substrate 10 and the second substrate 20 in the first area a, the third area c, and the fifth area e, so as to counteract the corresponding bending extrusion stress, thereby achieving uniform pressure on the curved display panel at various positions.

Further, a first area, a second area, a third area, a fourth area and a fifth area that are parallel to the non-curved edge and are equal in size are selected in a direction parallel to the non-curved edge of the curved display panel, wherein a first trisector of the curved display panel in the non-curved direction is located in the second area, and a second trisector of the curved display panel in the non-curved direction is located in the fourth area. The first and second trisectors refer to lines that are parallel to the non-curved edges of the curved display panel and divide the curved display panel into three regions equal in size. The height of the spacer group 41 provided on the first substrate 10 and the second substrate 20 in the second area b and the fourth area d is greater than the height of the spacer group 41 provided on the first substrate 10 and the second substrate 20 in the first area a, the third area c, and the fifth area e. Thus, by providing a spacer group 41 with a greater height in the second area b and the area d where the bending extrusion stress is greater, the first spacer 411 and the second spacer 412 of the spacer group 41 provided at the areas can provide greater supporting force to the first substrate 10 and the second substrate 20 in the second area b and the fourth area d, so as to counteract the bending extrusion stress.

Figure 5:
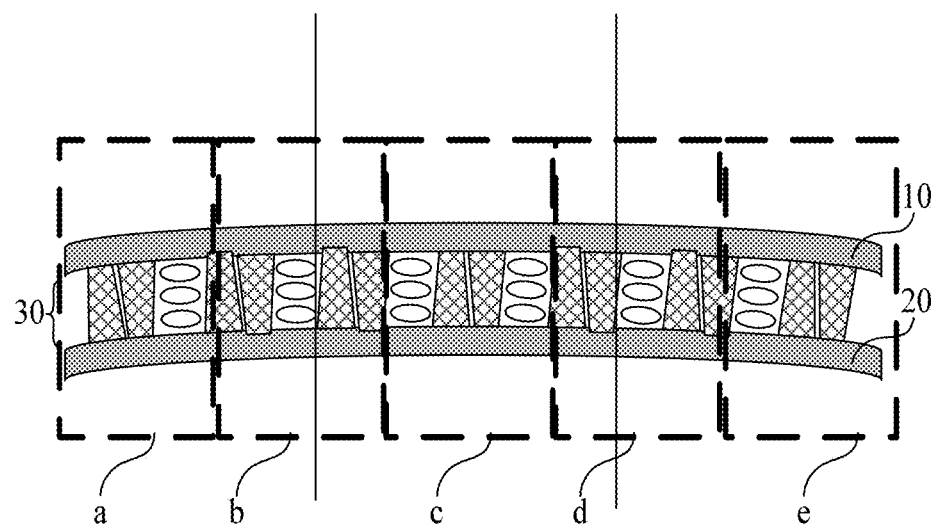
FIG. 5 is a schematic structural view of a curved display panel according to still another embodiment of the present disclosure

Exemplarily, as illustrated in FIG. 5, the ratio of the height of the spacer group 41 in the second area b and the fourth area d to the height of the spacer group 41 in the first area a, the third area c and the fifth area e is greater than 1 to less than or equal to 1.1. If the ratio of the height of the spacer group 41 in the second area b and the fourth area d to the height of the spacer group 41 in the first area a, the third area c and the fifth area e is 1, which means that the first spacer 411 and the second spacer 412 of the spacer group 41 on the first substrate 10 and the second substrate 20 are equal at various positions. Thus, the supporting forces applied by the spacer group 41 to the first substrate 10 and to the second substrate 20 are the same at various positions, and it is impossible to provide a first spacer 411 and a second spacer 412 with relatively greater height in the areas where the bending extrusion stress is relatively greater to enable the first spacer 411 and the second spacer 412 to provide a greater supporting force to the first substrate and the second substrate so as to counteract the bending extrusion stress, thereby eliminating the problem that the bending extrusion stress is greater in the second area b and the fourth area d. Since the bending extrusion stress on the second area b and the fourth area d of the curved display panel is greater than the bending extrusion stress on other areas, the difference between the bending extrusion stress in the second area b and the fourth area d and in other areas will be changed depending on the size of the curved display panel, but usually distributed in a certain range. If the ratio of the height of the spacer group 41 in the second area b and the fourth area d to the height of the spacer group 41 in the first area a, the third area c and the fifth area e is greater than 2, the supporting force applied by the spacer group 41 to the first substrate 10 and the second substrate 20 in the second area b and the fourth area d will be too great due to the excessive height of the spacer group 41 on the first substrate in the second area b and the fourth area d, which is not helpful to balance the bending extrusion stress at various positions all over the curved display panel.

At least one embodiment of the present disclosure provides a curved display device comprising any one of the curved display panel as described above.

When the curved display device is configured to perform a curved display, as the spacer layer 40 disposed between the first substrate 10 and the second substrate 20 of the curved display panel comprises a plurality of spacer group 41, and each of the plurality of spacer group 40 comprises a first spacer 411 provided on the first substrate 10 and a second spacer 412 provided on the second substrate 20, the supporting area of the spacer group 41 on the first substrate 10 is equal to or substantially equal to the supporting area of the spacer group on the second substrate 20, such that the bending extrusion stress applied to the first substrate 10 and the second substrate 20 and the supporting force applied on the first substrate 10 and the second substrate 20 are balanced, thereby making the overall cell thickness of the liquid crystal layer more uniform and improving the display effect of the curved surface display device.

In the above description of the structure and working principle of the curved display panel according to the embodiments of the present disclosure, the curved display device comprising the curved display panel has been correspondingly described, which will not be elaborated here.

The foregoing are merely exemplary embodiments of the disclosure, but are not used to limit the protection scope of the disclosure. The protection scope of the disclosure shall be defined by the attached claims.

The invention claimed is:

1. A curved display panel, comprising a first substrate and a second substrate cell-assembled to each other, a spacer layer disposed between the first substrate and the second substrate and configured to support the first substrate and the second substrate so as to form a gap, and a liquid crystal layer disposed in the gap, wherein the spacer layer comprises a plurality of spacer groups, each of the plurality of spacer groups comprises a first spacer provided on the first substrate and a second spacer provided on the second substrate, the plurality of spacer groups has a total supporting area on the first substrate as same as a total supporting area on the second substrates;
   wherein a first area, a second area, a third area, a fourth area and a fifth area that are parallel to a non-curved edge and are equal in size are sequentially selected along a direction parallel to the non-curved edge of the curved display panel, wherein a first trisector of the curved display panel in the non-curved direction is located in the second area, and a second trisector of the curved display panel in the non-curved direction is located in the fourth area, the first and second trisectors are lines that are parallel to non-curved edges of the curved display panel and divide the curved display panel into three regions equal in size;
   a total supporting area of the plurality of spacer groups on the first substrate or the second substrate in any one of the second area and the fourth area is greater than a total supporting area of the plurality of spacer groups on the first substrate or the second substrate in any one of the first area, the third area and the fifth area; and
   wherein a bottom surface area of any one of the first spacer and the second spacer of the each of the plurality of spacer groups in any one of the second area and the fourth area is greater than a bottom surface area of any one of the first spacer and the second spacer of the each of the plurality of spacer groups in any one of the first area, the third area and the fifth area, and a top surface area of any one of the first spacer and the second spacer of the each of the plurality of spacer groups in any one of the second area and the fourth area is greater than a top surface area of any one of the first spacer and the second spacer of the each of the plurality of spacer groups in any one of the first area, the third area and the fifth area.

2. The curved display panel according to claim 1, wherein the bottom surface area of the first spacer is equal to the bottom surface area of the second spacer, and an orthogonal projection of the top surface of the first spacer on a surface of the first substrate is within an orthogonal projection of the second spacer on the surface of the first substrate.

3. The curved display panel according to claim 2, wherein a ratio of the total supporting area of the plurality of spacer groups on the first substrate or the second substrate in any one of the second area and the fourth area to the total supporting area of the plurality of spacer groups on the first substrate or the second substrate is in any one of the first area, the second area and the fifth area is greater than 1 and less than or equal to 2.

4. The curved display panel according to claim 1, wherein density of the spacer groups in any one of the second area and the fourth area is greater than density of the spacer groups in any one of the first area, the third area and the fifth area.

5. A curved display device, comprising the curved display panel according to claim 1.

6. The curved display panel according to claim 1, wherein the top surface area of the first spacer is equal to the top surface area of the second spacer, the bottom surface area of the first spacer is equal to the bottom surface area of the second spacer, and an orthogonal projection of the first spacer on a surface of the first substrate and an orthogonal projection of the second spacer on the surface of the first substrate are non-overlapping.

7. The curved display panel according to claim 6, wherein density of the spacer groups in any one of the second area and the fourth area is greater than density of the spacer groups in any one of the first area, the third area and the fifth area.

8. The curved display panel according to claim 1, wherein a ratio of the total supporting area of the plurality of spacer groups on the first substrate or the second substrate in any one of the second area and the fourth area to the total supporting area of the plurality of spacer groups on the first substrate or the second substrate is in any one of the first area, the third area and the fifth area is greater than 1 and less than or equal to 2.

9. A curved display panel, comprising a first substrate and a second substrate cell-assembled to each other, a spacer layer disposed between the first substrate and the second substrate and configured to support the first substrate and the second substrate so as to form a gap, and a liquid crystal layer disposed in the gap, wherein the spacer layer comprises a plurality of spacer groups, each of the plurality of spacer groups comprises a first spacer provided on the first substrate and a second spacer provided on the second substrate, the plurality of spacer groups has a total supporting area on the first substrate as same as a total supporting area on the second substrate;

wherein a first area, a second area, a third area, a fourth area and a fifth area that are parallel to a non-curved edge and are equal in size are sequentially selected along a direction parallel to the non-curved edge of the curved display panel, wherein a first trisector of the curved display panel in the non-curved direction is located in the second area, and a second trisector of the curved display panel in the non-curved direction is located in the fourth area, the first and second trisectors are lines that are parallel to non-curved edges of the curved display panel and divide the curved display panel into three regions equal in size;

a maximal height of each spacer group of the plurality of spacer groups in any one of the second area and the fourth area is greater than a maximal height of each spacer group of the plurality of spacer groups in any one of the first area, the third area and the fifth area.

10. The curved display panel according to claim 9, wherein a ratio of the height of the each spacer group of the plurality of spacer groups in any one of the second area and the fourth area to the height of the each spacer group of the plurality of spacer groups in any one of the first area, the third area and the fifth area is greater than 1 to less than or equal to 1.1.

* * * * *